(12) United States Patent
Arthur

(10) Patent No.: US 7,045,235 B2
(45) Date of Patent: May 16, 2006

(54) FUEL CELL SYSTEM INCLUDING AIR FLOW CONTROL

(75) Inventor: Alan R Arthur, S. Salem, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 10/382,401

(22) Filed: Mar. 5, 2003

(65) Prior Publication Data

US 2004/0197620 A1 Oct. 7, 2004

(51) Int. Cl.
*H01M 8/04* (2006.01)

(52) U.S. Cl. .............................. 429/24; 429/26; 429/34

(58) Field of Classification Search ................. 429/26, 429/20, 19, 22, 24, 25, 23, 34, 38; 165/121, 165/122, 132; 62/186, 187, 314

See application file for complete search history.

(56) References Cited

U.S. PATENT DOCUMENTS

| | | | |
|---|---|---|---|
| 3,507,702 A | | 4/1970 | Sanderson |
| 4,640,873 A | * | 2/1987 | Tajima et al. .................. 429/24 |
| 4,729,930 A | | 3/1988 | Beal et al. |
| 4,938,903 A | * | 7/1990 | Schaeffer et al. ........... 264/565 |
| 5,470,671 A | * | 11/1995 | Fletcher et al. ............... 429/26 |
| 2002/0112494 A1 | | 8/2002 | Harth |
| 2003/0227732 A1* | | 12/2003 | Dessiatoun et al. ......... 361/103 |

* cited by examiner

*Primary Examiner*—Raymond Alejandro

(57) ABSTRACT

Fuel cell assemblies including a fuel cell, a heat exchanger, and apparatus that individually controls the respective amounts of oxidant flowing to the fuel cell and to the heat exchanger.

33 Claims, 5 Drawing Sheets

FUEL CELL SYSTEM INCLUDING AIR FLOW CONTROL

BACKGROUND OF THE INVENTIONS

1. Field of the Inventions

The present inventions are related to fuel cells.

2. Description of the Related Art

Fuel cells, which convert reactants (i.e. fuel and oxidant) into electricity and reaction products, are advantageous because they are not hampered by lengthy recharging cycles, as are rechargeable batteries, and are relatively small, lightweight and produce virtually no environmental emissions. Nevertheless, the present inventor has determined that conventional fuel cells are susceptible to improvement in the area of air flow management.

There are a variety of operating requirements associated with the air flow demand in a fuel cell. The oxidant in a fuel cell reaction is frequently the oxygen in ambient air and, accordingly, air flow is required to maintain the reaction. The air flow is also used to transport water vapor, which is a byproduct of the reaction, out of the fuel cell so that it does not obstruct the cathode surface. The level of air flow required to transport water vapor will typically be varied as a function of the ambient temperature and relative humidity. Cool, relatively humid air is not as capable of extracting moisture from the fuel cell as hot, relatively dry air and, accordingly, greater air flow is required to extract the moisture when the air is relatively cool and humid. Another byproduct of the fuel cell reaction is heat, which much be removed from the fuel cell in order to prevent thermal runaway as well as the associated material set failure and, in the case of proton exchange membrane ("PEM") fuel cells, membrane dry out. In addition to using the cathode air to remove heat from the fuel cell, many fuel cell systems include heat exchangers. Heat exchangers draw heat away from the fuel cell and air flow is used to remove heat from the heat exchanger. Relatively hot air is not as capable of removing heat from the heat exchanger as relatively cool air and, accordingly, greater air flow over the fuel cell and heat exchanger is required to cool the fuel cell when the air is relatively hot.

The inventor herein has determined that there are ambient conditions which cause the operating requirements to be in conflict with one another. When the air is hot and dry, for example, cooling the fuel cell will require a relatively high air flow rate because the air is hot. However, because the air is also dry, the high air flow rate can result in too much moisture being removed from the PEM if only cathode air is used to cool the fuel cell. This can, ultimately, lead to cell failure. One possible answer to the problems associated with conflicting operating requirements is to provide a pair of fans, one of which directs air to the cathode and one of which directs air to a heat exchanger. The fans are powered by the fuel cell during steady state operation and reduce the net power available from the fuel cell. The inventor herein has determined that it is undesirable to have two fans drawing power from the fuel cell because it unduly reduces the amount of power available for other uses.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies and fuel cell systems, including those presently being developed or yet to be developed. For example, although various exemplary fuel cell systems are described below with reference to proton exchange membrane ("PEM") fuel cells, other types of fuel cells and other devices requiring power efficient multiple flow path air routing and flow management, are equally applicable to the present inventions. Additionally, although the exemplary system includes a stack with two fuel cells, the present inventions systems encompass systems with any number of fuel cells.

Figure 1:
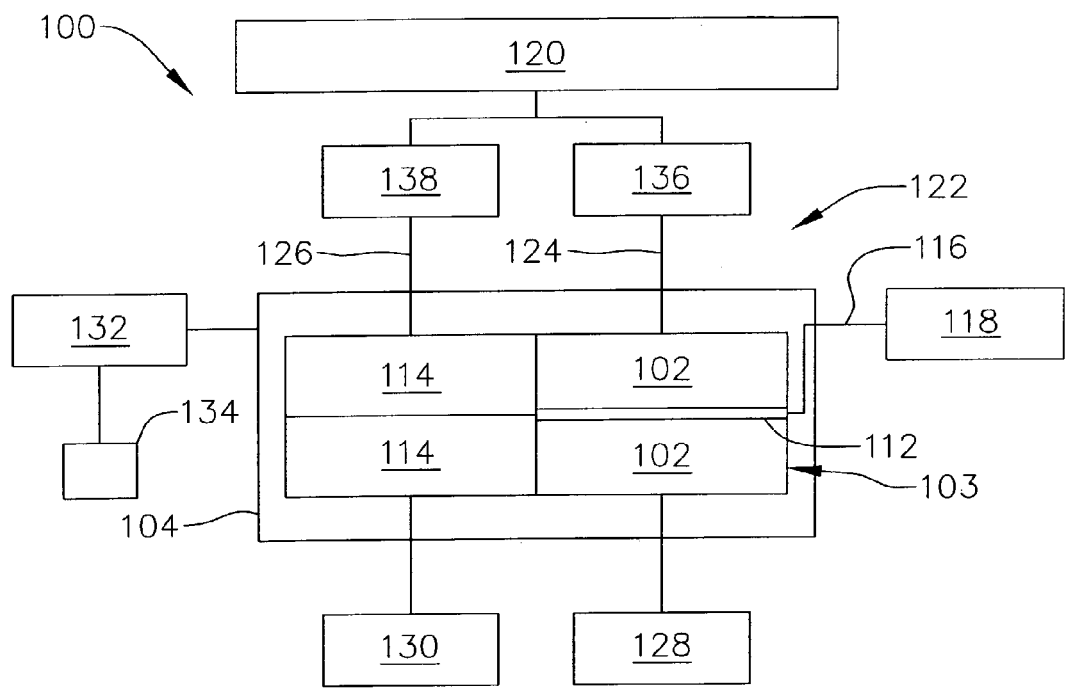
FIG. 1 is a diagrammatic view of a fuel cell system in accordance with a preferred embodiment of a present invention.
Figure 2:
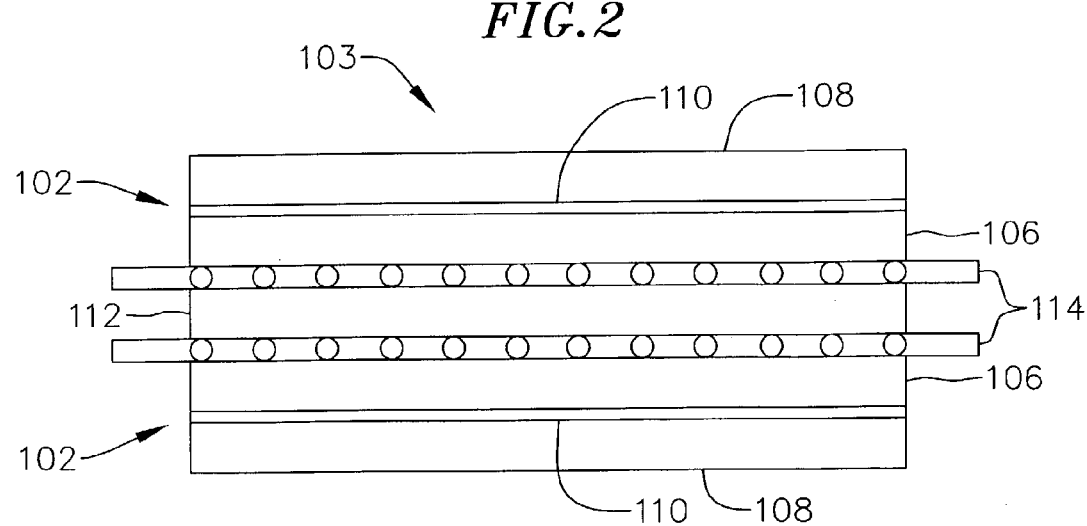
FIG. 2 is a side view of a fuel cell stack in accordance with a preferred embodiment of a present invention.

As illustrated for example in FIGS. 1 and 2, a fuel cell system 100 in accordance with one embodiment of a present invention has a pair of PEM fuel cells 102 arranged in a stack 103 within a fuel cell housing 104. Each of the fuel cells 102 includes an anode 106 and a cathode 108 separated by a PEM 110. Fuel, such as a methanol and water mixture, is supplied to the anodes 106 and oxygen supplied to the cathodes 108. The fuel is electrochemically oxidized at an anode catalyst, thereby producing protons that migrate across the conducting PEM 110 and react with the oxygen at a cathode catalyst to produce a bi-product (water in the exemplary embodiment). A fluid disbursement media 112, such as a porous or capillary structure, is positioned between the anodes 106. Depending on the type of fuel cell and the intended use of the system, other fuels, fuel disbursement media, and oxidants may be used. With respect to current collection, current collectors (not shown) may be formed on or within each anode 106 and cathode 108. Suitable current collector materials include coated stainless steel, gold and platinum. Alternatively, materials such as lanthanum strontium chromite with good electrical conductive properties may be added to the materials used to form the anodes 106 and cathodes 108. The anode contact pads of adjacent fuel cells 102 may be connected to one another in series, as may the cathode contact pads. The actual connection scheme will, however, depend on the power requirements of the load.

One or more heat exchangers may also be provided in order to cool the fuel cells 102. The heat exchangers 114 in the illustrated embodiment are positioned adjacent to the anodes 106, but may also be located on the cathodic surface or within the fuel cells if dictated by the thermal characteristics of the fuel cells. Suitable heat exchangers include fine wire heat exchangers (as shown), sealed heat pipes, in which a media evaporates at one end of the pipes and condenses at the other, pin heat exchangers and extruded profile heat exchangers.

A fuel manifold 116 within the housing 104 distributes fuel from a fuel source 118 to the fluid disbursement media 112, which in turn distributes the fuel to the anodes 106. It should be noted that the present fuel cell systems include those in which the fuel source 118 is replenishable (or replaceable) as well as those in which all of the fuel that will be consumed is initially present in the fuel source. Oxygen for the fuel cells 102 is provided by an oxygen source, such as the exemplary ambient air supplying vent and fan arrangement 120 or other air mover, which is connected to the fuel cells by an oxygen manifold 122. The oxygen manifold 122 also supplies ambient air to the heat exchangers 114. Accordingly, the oxygen manifold is preferably provided with at least two air flow paths, a fuel cell path 124 and a heat exchanger path 126. Air, including any unused oxygen and byproducts, exits the fuel cells 102 and is vented out of the housing 104, along with the air that has passed through the heat exchangers 114, by way of vents 128 and 130. Fuel side byproducts such as carbon dioxide are also vented from the fuel cell stack 103.

A controller 132 may be provided to monitor and control the operations of the exemplary fuel cell system 100. The operation of the fuel cell system 100 may, alternatively, be controlled by the host (i.e. power consuming) device. In either case, a sensor arrangement 134 will monitor fuel cell operating conditions, such as temperature, power load, and internal humidity, as well as ambient operating conditions, such as temperature, humidity and air pressure, all of which affect the operating requirements of the fuel cells 102.

The exemplary fuel cell system 100 also includes apparatus for individually adjusting the flow of air from the vent and fan arrangement 120 to the fuel cell path 124 and heat exchanger path 126. In the exemplary implementation, a damper 136 is positioned downstream from the vent and fan arrangement 120 at the inlet of the fuel cell path 124 and a damper 138, which is operable independently of the damper 136, is positioned downstream from the vent and fan arrangement at the inlet of heat exchanger path 126. The dampers 136 and 138 may be any suitable device that is capable of selectively blocking air flow into the associated manifold path. The dampers 136 and 138 may also be two of the same type of damper, or may be two different types of dampers. Operation of the dampers is discussed in greater detail below with reference to FIGS. 3, 4 and 6–9.

Figure 3:
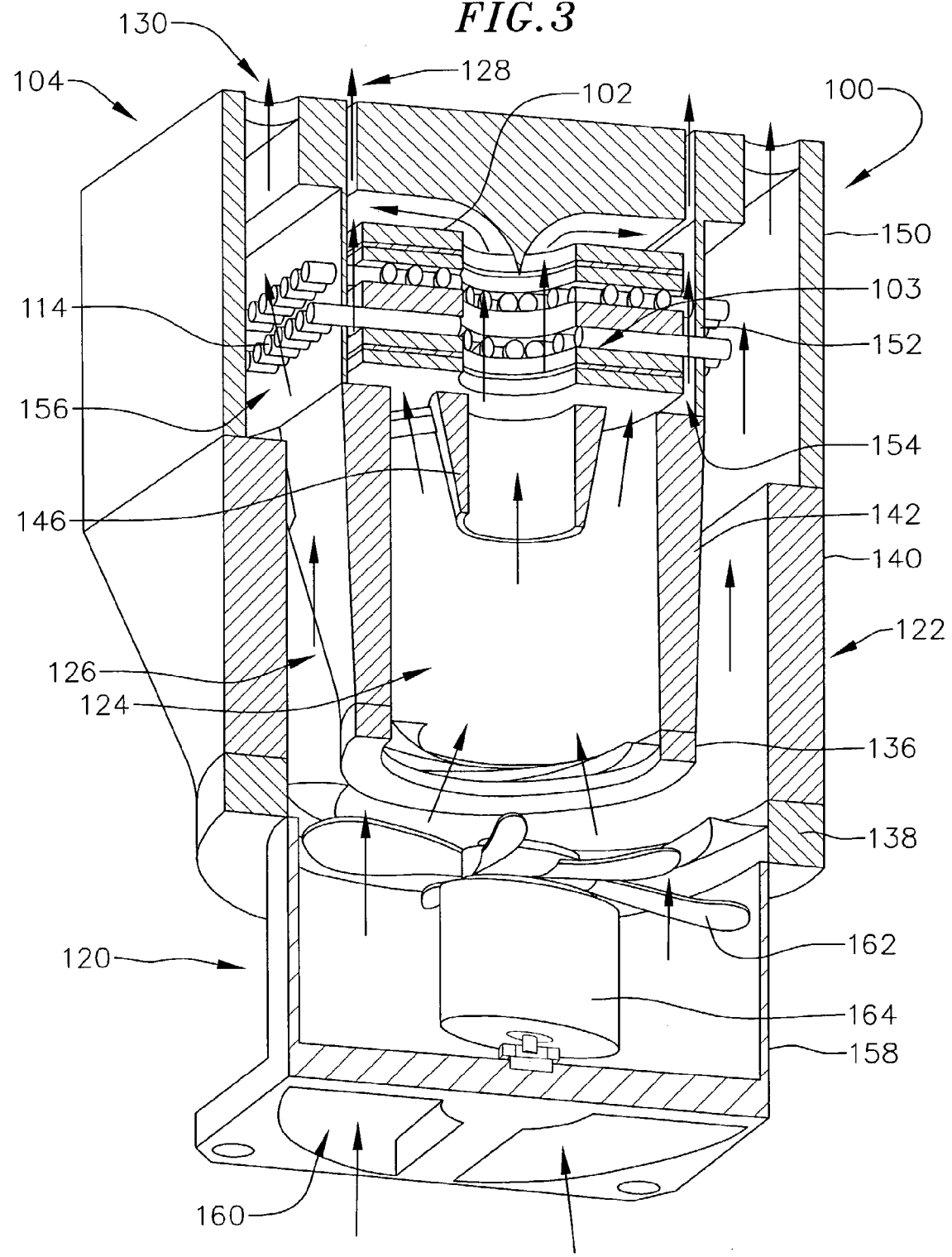
FIG. 3 is a section view of a fuel cell system in accordance with a preferred embodiment of a present invention.
Figure 4:
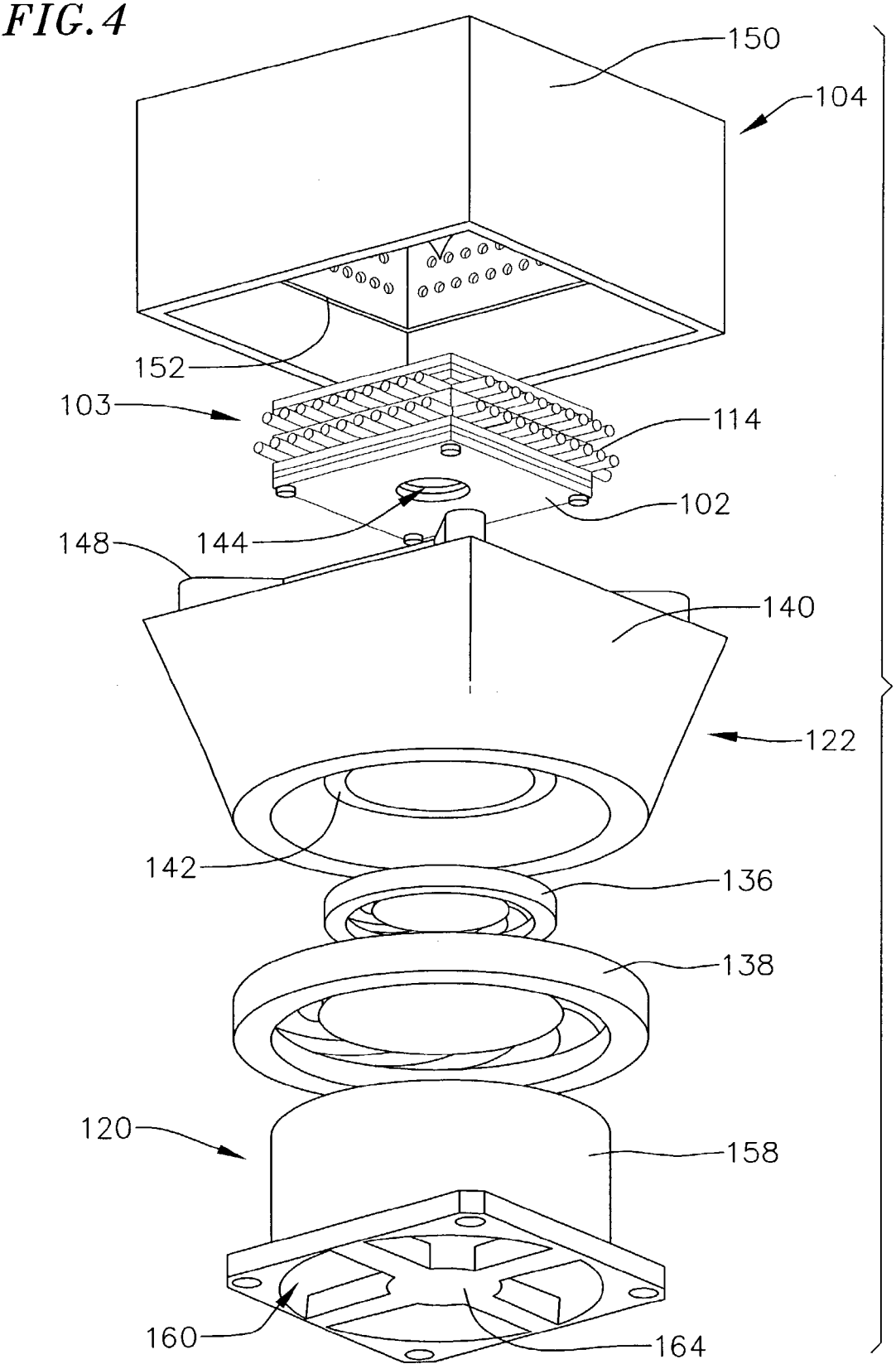
FIG. 4 is an exploded view of the fuel cell system illustrated in FIG. 3.
Figure 5:
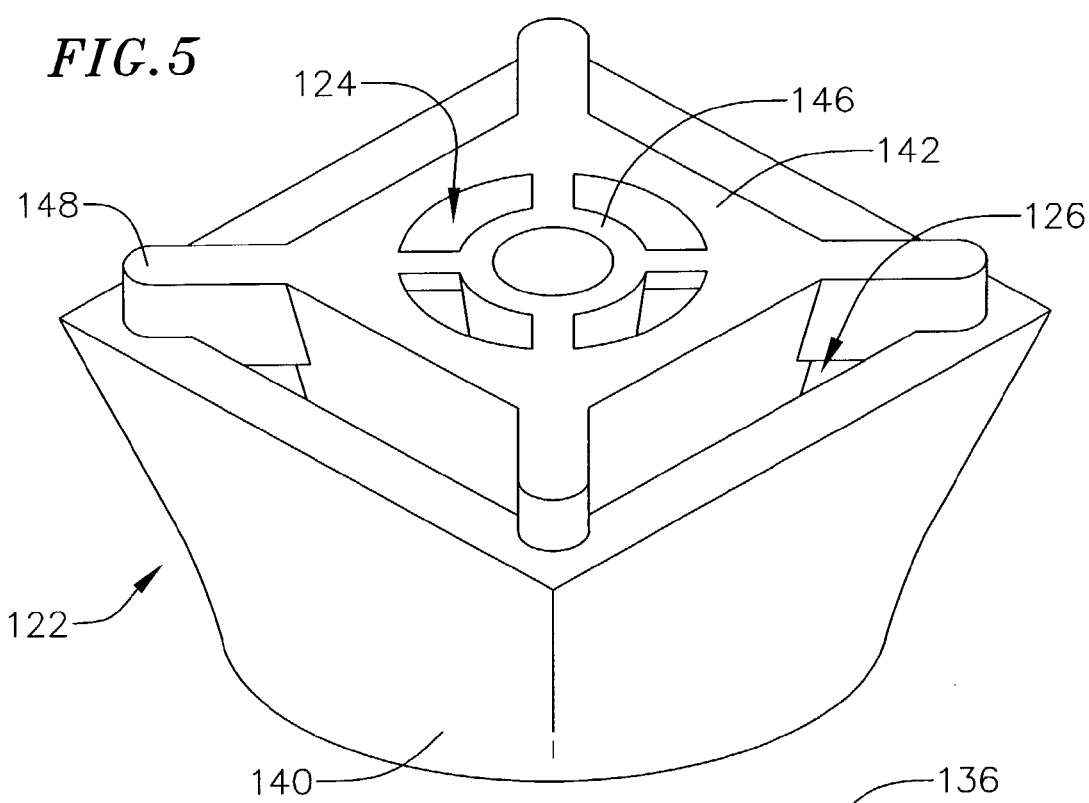
FIG. 5 is a perspective view of a manifold in accordance with a preferred embodiment of a present invention.

The exemplary oxygen manifold 122 illustrated in FIGS. 3–5 is configured such that the heat exchanger path 126 is positioned around the fuel cell path 124. The paths 124 and 126 are defined by an exterior wall 140 and an interior conduit 142. The exemplary fuel cell stack 103 includes a central oxygen aperture 144 (FIG. 4) and a portion of the oxygen flowing though the fuel cell path 124 is directed into the central aperture by a central conduit 146. The interior conduit 142 is secured to the exterior wall 140, and the central conduit 146 is connected to the interior conduit 142, by connectors 148. The connectors 148 also mate with correspondingly shaped and positioned receptacles (not shown) in the fuel cell housing 104.

Turning to the configuration of the exemplary fuel cell housing 104 illustrated in FIGS. 3 and 4, the fuel cell housing includes an exterior wall 150 and an interior conduit 152. The fuel cell stack 103 is positioned within the interior conduit 152. The interior conduit 152 is secured to the exterior wall 150 by connectors (not shown) in a manner similar to the oxygen manifold exterior wall 140 and interior conduit 142. An oxygen manifold, including a fuel cell path 154 and a heat exchanger path 156, is defined by the exterior wall 150 and interior conduit 152. Portions of the heat exchangers 114 extend through the interior conduit 152 into the heat exchanger path 156 where they may be cooled by ambient air provided by an air mover (e.g. the vent and fan arrangement 120). The fuel cell and heat exchanger paths 154 and 156 in the fuel cell housing 104 are respectively connected to the fuel cell and heat exchanger paths 124 and 126 in the oxygen manifold 122.

A portion of the air that has passed through the oxygen manifold fuel cell path 124 in the exemplary system illustrated in FIGS. 3–5 will enter the housing fuel cell path 154 and the remainder of the air will pass through the central aperture 144. Air passing through the fuel cell path 154 will travel along the exposed surfaces of the cathodes 108 and the oxygen therein will be consumed by the fuel cell reaction. The respective portions of the anodes 106, PEM 110 and fluid disbursement media 112 that face the fuel cell path 154 are appropriately sealed to prevent exposure to the air. As noted above, the air (including any byproducts and unused oxygen) will then exit the fuel cell housing 104 by way of the vents 128. Air that has passed through the oxygen manifold heat exchanger path 126 will enter the fuel cell housing heat exchanger path 156, pass over the exposed portions of the heat exchangers 114, and exit by way of the vent 130.

As noted above, an air mover positioned near the inlets of the fuel cell path 124 and heat exchanger path 126 is one example of an oxidant supply. The exemplary vent and fan arrangement 120 illustrated in FIGS. 3 and 4 includes a housing 158 with vents 160 and a fan 162 that is driven by a motor 164. The actuation and speed of the motor 164 are preferably controlled by the controller 132.

Figure 6:
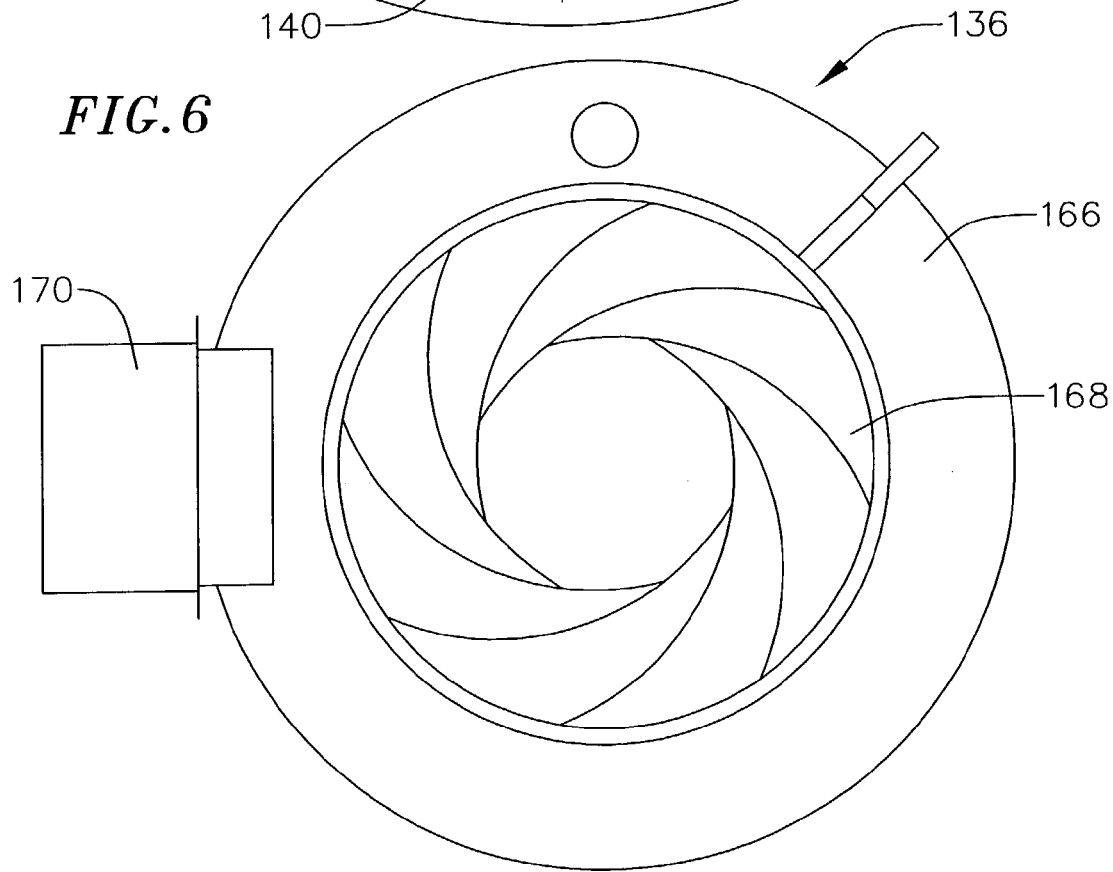
FIG. 6 is a plan view of a damper in accordance with a preferred embodiment of a present invention.

The dampers 136 and 138 in the exemplary implementation are both iris type dampers. Iris type dampers are particularly useful given the configuration of the oxygen manifold 122 and the low profile of iris type dampers. Referring to FIG. 6, the exemplary iris damper 136 includes an outer frame 166 and a plurality of blades 168. The blades 168 are connected to an actuator 170 which drives the blades between an open orientation and a closed orientation. The actuator may be connected to the controller 132, thereby enabling the controller to control the position of the blades 168. Damper 136 is movable between the fully open orientation illustrated in FIG. 3, which does not limit the amount of air flowing into the fuel cell path 124, to a mostly closed orientation, which allows a relatively small amount of air to flow into the fuel cell path, and various orientations therebetween. Damper 138 has a similar overall configuration and, when in the fully open orientation, will not block the flow of air into heat exchanger path 126. In the fully closed orientation, damper 138 will close far enough to block the inlet of the heat exchanger path 126, thereby allowing little to no air flow into the heat exchanger path, while allowing air to flow into the fuel cell path. The damper 138 may also be moved to various orientations between the fully open and closed orientations.

The dampers 136 and 138 may be used in conjunction with an air mover such as the vent and fan arrangement 120, as well as the controller 132 and sensor arrangement 134 (FIG. 1), to satisfy a wide variety of operating requirements, internal fuel cell operating conditions and ambient operating conditions. At startup, the sensor arrangement 134 will sample ambient operating conditions and fuel cell operating conditions. The controller 132 will use the ambient and fuel cell temperature and relative humidity information, as well as ambient air pressure, from the sensor arrangement 134 and load information from the power consuming device to determine the optimal initial settings for the fuel supply rate, the respective orientations of the dampers 136 and 138 and the speed of the fan motor 164. Optimal combinations of fuel supply rate, fan speed and damper orientations for various combinations of load, ambient air temperature, humidity and pressure, and fuel cell internal temperature and humidity may be stored in a lookup table. Typically, in addition to the load information, the controller 132 will continue to monitor the fuel cell and ambient operating conditions so that settings for the respective orientations of the dampers 136 and 138 and the speed of the fan motor 164 can be adjusted as necessary.

Figure 7:
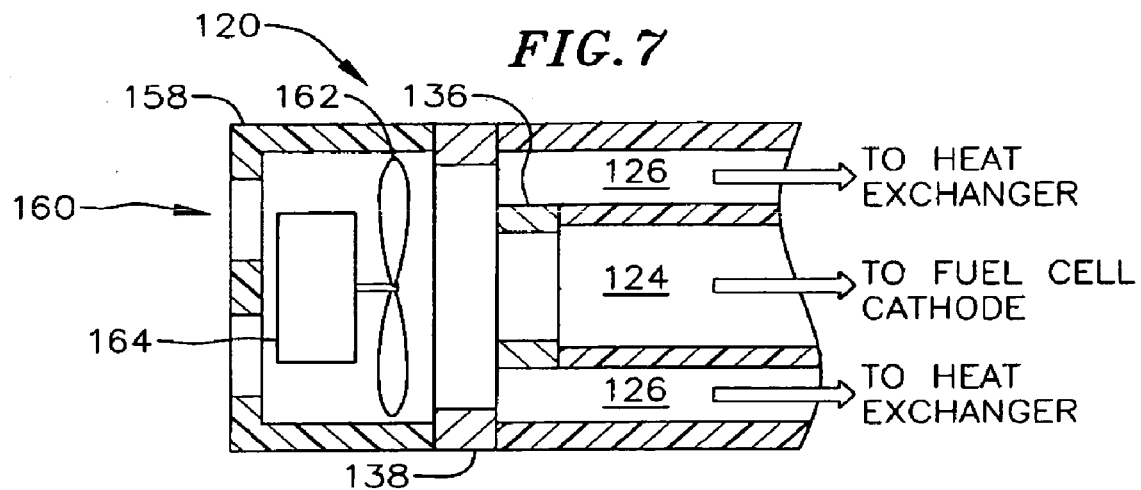
FIG. 7 is a diagrammatic section view of a fan and damper arrangement in accordance with a preferred embodiment of a present invention.

As illustrated for example in FIG. 7, in those instances where the ambient operating conditions are normal (e.g. a temperature of about 20° C. to about 30° C. and a relative humidity of about 20% to about 70%), the controller 132 will position the dampers 136 and 138 in their fully open orientations. The fan speed and fuel supply rate may be adjusted as necessary to accommodate variations in the load.

Figure 8:
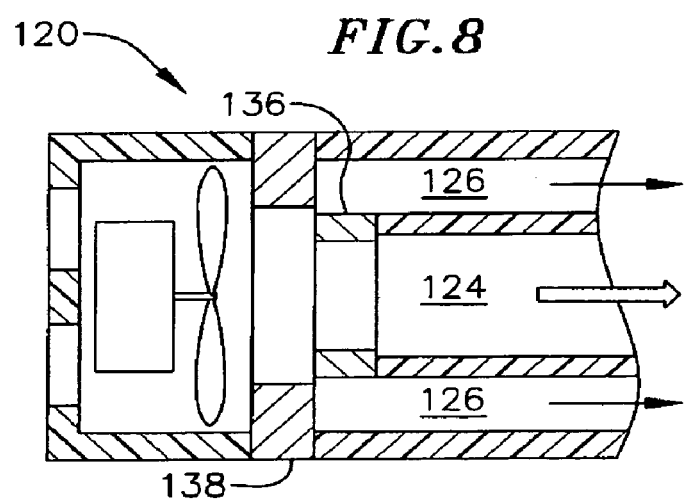
FIG. 8 is a diagrammatic section view of the fan and damper arrangement illustrated in FIG. 7 with one of dampers substantially closed.
Figure 9:
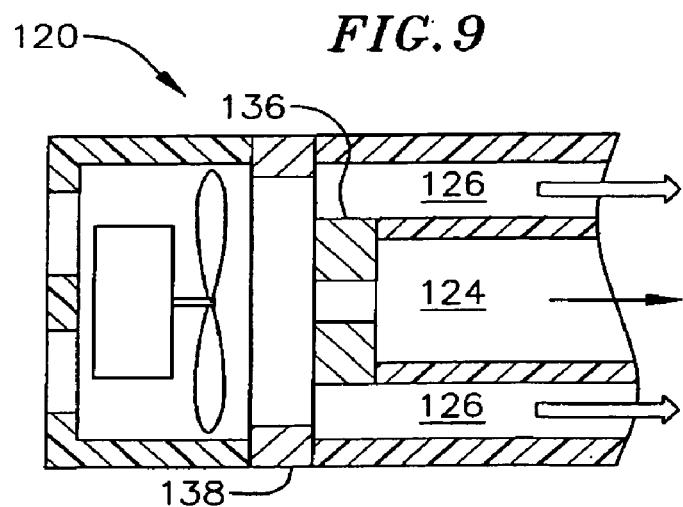
FIG. 9 is a diagrammatic section view of the fan and damper arrangement illustrated in FIG. 7 with one of dampers substantially closed.

Turning to FIG. 8, in those instances where the ambient operating conditions are relatively cool and wet (e.g. a temperature below about 20° C. and a relative humidity above about 70%), the controller 132 will position the damper 136 in its fully open orientation, which allows maximum air flow to the fuel cell path 124, and the damper 138 in its fully closed orientation, which allows little to no air flow into the heat exchanger path 126, while allowing air to flow into the fuel cell path. Fan speed and fuel supply rate may be adjusted as necessary. Maximum air flow to the fuel cells 102 insures that, despite the humidity in the air, the air will absorb the condensation on the cathodes 108. However, because little or no air is flowing to the heat exchangers 114, the temperature of the fuel cells 102 will stay in the desired operating temperature range.

The exemplary system 100 will also adjust to ambient operating conditions which are relatively hot and dry (e.g. a temperature above about 30° C. and a relative humidity below about 20%). Here, the controller 132 will position the damper 136 in its mostly closed orientation, which minimizes air flow to the fuel cell path 124, and will position the damper 138 in its fully open orientation, which maximizes air flow to the heat exchanger path 126. Fan speed and fuel supply rate may be adjusted as necessary. Maximizing air flow to the heat exchangers 114 will prevent the system 100 from overheating, while minimizing the flow of dry air to the fuel cells 102 will prevent the PEMs 110 from drying out.

The exemplary ambient operating conditions described above with reference to FIGS. 8 and 9 are relatively extreme. The controller 132 will, of course, position the dampers 136 and 138 in various respective partially closed orientations when the ambient conditions so require. Accordingly, in addition to fan speed, the present damper arrangement allows the controller 132 to fine tune the respective amounts of air flow to the fuel cells 102 and heat exchangers 114 without the power loss associated with the use of two fans or other air movers.

Although the present inventions have been described in terms of the preferred embodiments above, numerous modifications and/or additions to the above-described preferred embodiments would be readily apparent to one skilled in the art. By way of example, but not limitation, the present inventions are not limited to any particular manifold configuration or damper type. The oxygen manifold may, for example, be configured such that the fuel cell path and the heat exchanger path are side by side or otherwise not one inside the other as they are in the illustrated embodiment. With respect to the dampers, other suitable air flow damper configurations and designs, such as disc, single vane and multi-vane configurations, can be used. The present inventions are also not limited for the exemplary fan arrangement. Other types of air movers, such as a blower, may also be employed. It is intended that the scope of the present inventions extend to all such modifications and/or additions.

I claim:

1. A fuel cell assembly, comprising:
   a fuel cell;
   a heat exchanger associated with the fuel cell;
   an oxidant source;
   an oxidant manifold including a manifold inlet operably connected to the oxidant source, a fuel cell path associated with the manifold inlet and the fuel cell, and a heat exchanger path associated with the manifold inlet and the heat exchanger;
   a first damper associated with the oxidant manifold fuel cell path; and
   a second damper associated with the oxidant manifold heat exchanger path;
   wherein the first and second dampers are positioned relative to the oxidant manifold such that at least some of the oxidant from the oxidant source will pass one of the first and second dampers on its way to the other of the first and second dampers.

2. A fuel cell assembly as claimed in claim 1, wherein the fuel cell comprises a PEM fuel cell.

3. A fuel cell assembly as claimed in claim 1, wherein the heat exchanger comprises a plurality of wires.

4. A fuel cell assembly as claimed in claim 1, wherein the oxidant source comprises a single vent and fan arrangement.

5. A fuel cell assembly as claimed in claim 1, wherein the second damper is located upstream from the first damper.

6. A fuel cell assembly as claimed in claim 1, wherein at least one of the first and second dampers comprises an iris damper.

7. A fuel cell assembly as claimed in claim 1, wherein the first and second dampers are independently operable.

8. A fuel cell as assembly as claimed in claim 1, further comprising:
   a fuel cell housing in which the fuel cell is supported, the fuel cell housing including a fuel cell housing manifold with a fuel cell path operably connected to the oxidant manifold fuel cell path and a heat exchanger path operably connected to the oxidant manifold heat exchanger path.

9. A fuel cell assembly, comprising:
   a fuel cell;
   a heat exchanger associated with the fuel cell;
   an oxidant source;
   an oxidant manifold including a manifold inlet operably connected to the oxidant source, a fuel cell path associated with the manifold inlet and the fuel cell, and a heat exchanger path associated with the manifold inlet and the heat exchanger, the oxidant manifold fuel cell path and heat exchanger path being substantially concentric;

a first damper associated with the oxidant manifold fuel cell path; and a second damper associated with the oxidant manifold heat exchanger path.

10. A fuel cell assembly as claimed in claim 9, wherein the second damper is located upstream from the first damper.

11. A fuel cell assembly as claimed in claim 10, wherein at least one of the first and second dampers comprises an iris damper.

12. A fuel cell assembly as claimed in claim 9, wherein the first and second dampers are independently operable.

13. A fuel cell assembly as claimed in claim 9, wherein one of the fuel cell path and the heat exchanger path defines a perimeter that extends completely around the other of the fuel cell path and the heat exchanger path.

14. A fuel cell assembly as claimed in claim 9, wherein the heat exchanger path defines a perimeter that extends completely around the fuel cell path.

15. A fuel cell assembly, comprising:
a fuel cell;
a heat exchanger associated with the fuel cell;
an oxidant source;
an oxidant manifold including a manifold inlet operably connected to the oxidant source, a fuel cell path associated with the manifold inlet and the fuel cell, and a heat exchanger path associated with the manifold inlet and the heat exchanger;
a first damper associated with the oxidant manifold fuel cell path;
a second damper associated with the oxidant manifold heat exchanger path; and
a controller, operably connected to the first and second dampers, that selectively adjusts the first and second dampers between respective fully open orientations, partially open orientations, fully closed orientations, and adjusts the first and second dampers to the same orientation in response to a first operating condition and adjusts the first and second dampers to different orientations in response to a second operating condition that is different than the first operating condition.

16. A fuel cell assembly as claimed in claim 15, wherein the second operating condition comprises a relatively cool and wet ambient operating condition and the controller adjusts the first damper to the fully open orientation and the second damper to the fully closed orientation in response to the relatively cool and wet ambient operating condition.

17. A fuel cell assembly as claimed in claim 15, wherein the second operating condition comprises a relatively hot and dry ambient operating condition and the controller adjusts the first damper to the fully closed orientation and the second damper to the fully open orientation in response to the relatively hot and dry ambient operating condition.

18. A fuel cell assembly as claimed in claim 15, wherein the first operating condition comprises an ambient operating condition or a fuel cell operating condition.

19. A fuel cell assembly as claimed in claim 15, wherein the second operating condition comprises an ambient operating condition or a fuel cell operating condition.

20. A fuel cell assembly, comprising:
a fuel cell including and anode and a cathode;
a heat exchanger associated with the fuel cell positioned adjacent to the anode;
an oxidant source that supplies an oxidant flow;
an oxidant manifold including a manifold inlet operably connected to the oxidant source such that the oxidant flow from the oxidant source enters the oxidant manifold, a fuel cell path associated with the manifold inlet and the fuel cell, and a heat exchanger path associated with the manifold inlet and the heat exchanger; and control means for individually controlling the amount of oxidant flow from the oxidant source to the fuel cell path and the amount of oxidant flow from the oxidant source to the heat exchanger path.

21. A fuel cell assembly as claimed in claim 20, wherein the fuel cell comprises a PEM fuel cell.

22. A fuel cell assembly as claimed in claim 20, wherein the heat exchanger comprises a plurality of wires.

23. A fuel cell assembly as claimed in claim 20, wherein the oxidant source comprises a single vent and fan arrangement.

24. A fuel cell assembly as claimed in claim 20, wherein the oxidant manifold fuel cell path and heat exchanger path are substantially concentric.

25. A fuel cell assembly as claimed in claim 20, further comprising:
a sensor arrangement adapted to measure fuel cell and ambient air temperature, pressure and humidity;
wherein the control means individually controls the amount of oxidant flow from the oxidant source to the fuel cell path and the amount of oxidant flow from the oxidant source to the heat exchanger path based on at last one of fuel cell temperature and humidity and ambient air temperature, pressure and humidity.

26. A fuel cell assembly, comprising:
a fuel cell;
a heat exchanger associated with the fuel cell;
an oxidant source that supplies an oxidant flow;
an oxidant manifold including a fuel cell path associated with the oxidant source and the fuel cell and a heat exchanger path associated with the oxidant source and the heat exchanger; and
means for reducing the amount of oxidant that flows from the oxidant source to the fuel cell path while allowing maximum air flow to the heat exchanger path in response to a first ambient operating condition measurement and reducing the amount of oxidant that flows from the oxidant source to the heat exchanger path while allowing maximum air flow to the fuel cell oath in response to a second ambient operating condition measurement that is different than the first ambient operating condition measurement.

27. A fuel cell assembly as claimed in claim 26, wherein the at least one ambient operating condition comprises ambient temperature.

28. A fuel cell assembly as claimed in claim 27, wherein the at least one ambient operating condition comprises ambient temperature, pressure and humidity.

29. A fuel cell assembly as claimed in claim 26, wherein the at least one ambient operating condition comprises ambient humidity.

30. A fuel cell assembly as claimed in claim 26, wherein the fuel cell comprises a PEM fuel cell.

31. A fuel cell assembly as claimed in claim 26, wherein the heat exchanger comprises a plurality of wires.

32. A fuel cell assembly as claimed in claim 26, wherein the oxidant source comprises a single vent and fan arrangement.

33. A fuel cell assembly as claimed in claim 26, wherein the fuel cell path and heat exchanger path are substantially concentric.

* * * * *